United States Patent
Samuel et al.

(10) Patent No.: US 7,159,083 B2
(45) Date of Patent: Jan. 2, 2007

(54) PROGRAMMABLE TRANSITION STATE MACHINE

(75) Inventors: Roshan J. Samuel, Richardson, TX (US); Jason D. Kridner, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 358 days.

(21) Appl. No.: 10/319,238

(22) Filed: Dec. 13, 2002

(65) Prior Publication Data

US 2004/0117570 A1 Jun. 17, 2004

(51) Int. Cl.
*G06F 12/00* (2006.01)
*G06F 13/00* (2006.01)
*G06F 7/38* (2006.01)

(52) U.S. Cl. .......................... 711/156; 711/154; 326/46
(58) Field of Classification Search ................ 711/154; 712/1

See application file for complete search history.

(56) References Cited

U.S. PATENT DOCUMENTS

| | | | | | |
|---|---|---|---|---|---|
| 4,984,192 | A | * | 1/1991 | Flynn | 711/104 |
| 5,734,429 | A | * | 3/1998 | Jung | 375/240.01 |
| 5,978,275 | A | * | 11/1999 | Song et al. | 365/185.29 |
| 6,832,302 | B1 | * | 12/2004 | Fetzer et al. | 711/170 |
| 2004/0177300 | A1 | * | 9/2004 | Biewenga et al. | 714/727 |

* cited by examiner

*Primary Examiner*—Hyung Sough
*Assistant Examiner*—Mardochee Chery
(74) *Attorney, Agent, or Firm*—Robert D. Marshall, Jr.; W. James Brady; Frederick J. Telecky, Jr.

(57) ABSTRACT

The programmable transition state machine of this invention is designed to allow implementation of hardware capable of increasing the performance of critical encoding and decoding tasks in a microprocessor environment where a required encoding or decoding or machines is not known in advance. The state machine described may also be used in systems that need flexibility to support a wide variety of functions or machines or where a hardwired approach is not useful. This unique state machine processes the state information and the transition from a present state to a next state in CPU-programmable logic.

12 Claims, 5 Drawing Sheets

PROGRAMMABLE TRANSITION STATE MACHINE

TECHNICAL FIELD OF THE INVENTION

The technical field of this invention is programmable state machines.

BACKGROUND OF THE INVENTION

Some tasks such as encoding or decoding a serial data stream or cycle sensitive state machines, cannot be done at a sufficiently high performance level in software. Therefore, often encoders, decoders and state machines are implemented in hardware to improve performance. But in systems where behavioral flexibility is required, the hardwired approach is not useful and it is desirable to have a programmable state machine.

It has become customary to classify state machines into one of two types. The first, the Moore machine, generates next state conditions based solely on present state conditions. The Mealy machine, by contrast, generates next state conditions based both on present state conditions and the state of a set of input data values.

SUMMARY OF THE INVENTION

This invention describes a programmable state machine of the Mealy type, designed to allow implementation of hardware capable of increasing the performance of critical encoding and decoding tasks in a microprocessor environment where the cycle-by-cycle behavior is not known in advance. The state machine described may also be used in systems that need flexibility to support a wide variety of functions or machines or where a hardwired approach is not useful. This unique state machine processes input data and manages the transition from present state to next state of the state machine in CPU-programmable logic instead of hardwired logic.

BRIEF DESCRIPTION OF THE DRAWINGS

These and other aspects of this invention are illustrated in the drawings, in which.

DETAILED DESCRIPTION OF PREFERRED EMBODIMENTS

The programmable state machine of this invention may be used to interface a digital signal processor (DSP) to external devices. By placing the states of the state machine In software rather than hardware, the interface allows the digital signal processor to communicate with interfaces not allowed for in conventional state machine designs. The device is an ideal choice to interface the digital signal processor to LCD screens, analog front ends and other such devices.

Among the programmable features are:

1. The header parameters of jump address, header length and header pattern bits.
2. The state transition memory address and content.
3. The transition output table parameters of previous state, current state, output bits.
4. Shift and mask register parameters.
5. Clock counter parameters.

Serial State Machine Implementation

The state transition diagram of any state machine can be directly programmed into the machine of this invention. This enables the machine to be programmed as a universal asynchronous receiver/transmitter (UART), serial/parallel data interface or other similar interface.

Receive Operation

Figure 1:
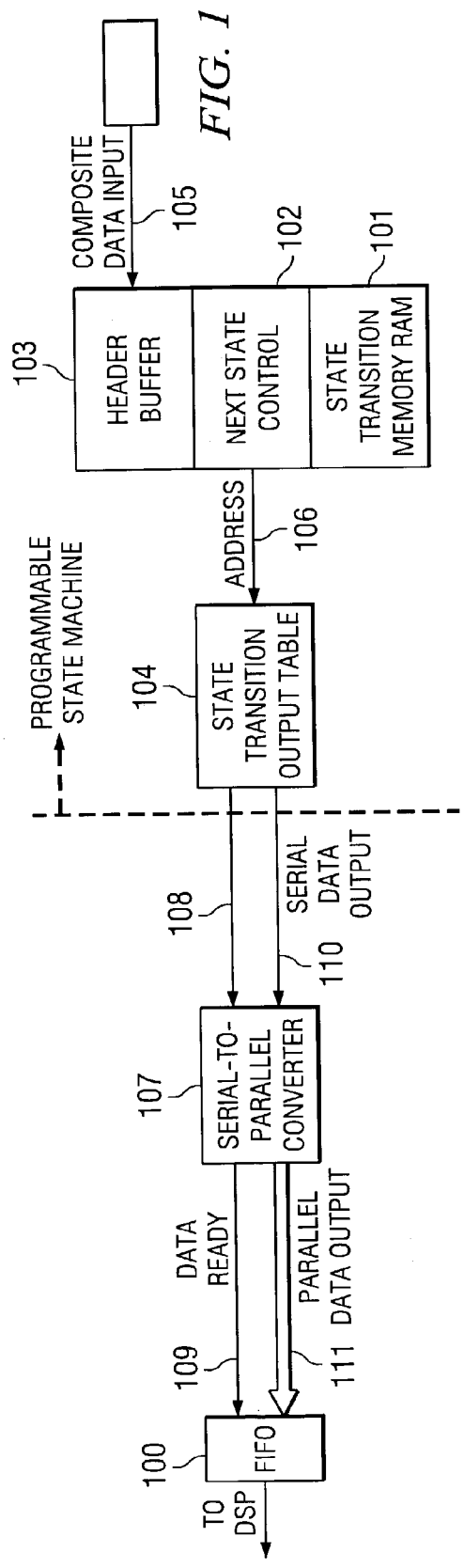
FIG. 1 illustrates the serial interface receive block diagram.

The main components of a serial interface using the programmable state machine of this invention are illustrated for receive operation in FIG. 1. These are: (a) a header buffer 103; (b) the state transition matrix comprised of the state transition memory RAM 101 and the next state control block 102; and (c) state transition output table 104.

Figure 6:
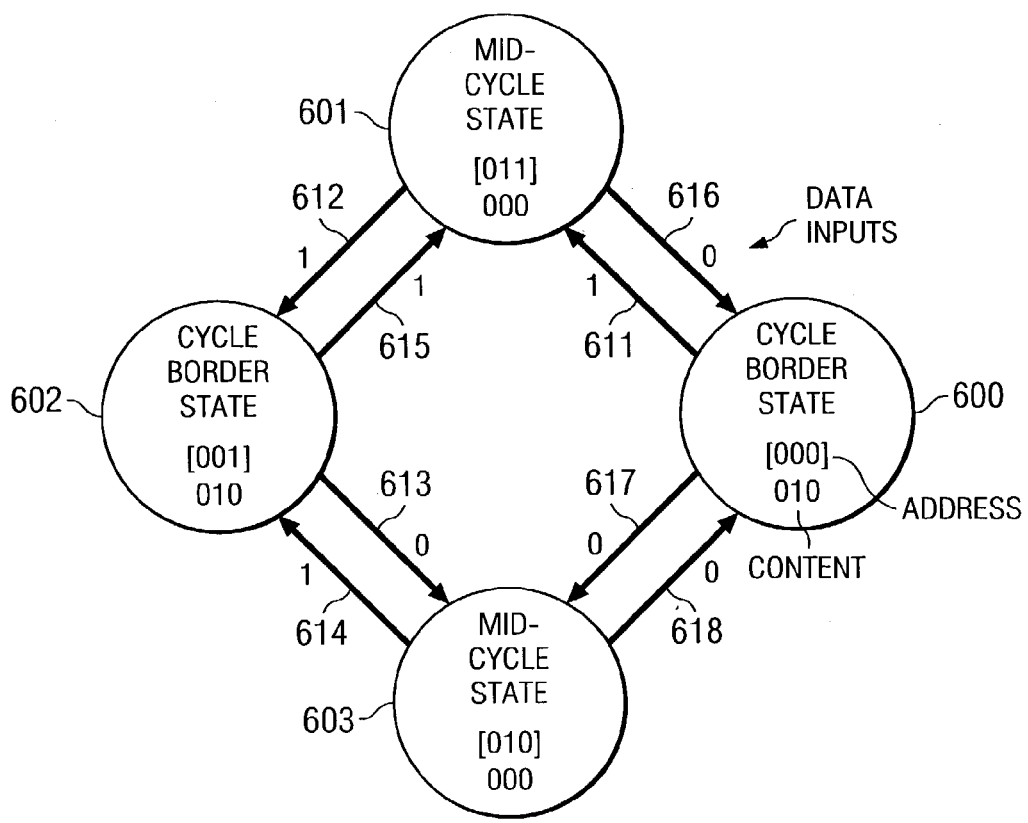
FIG. 6 illustrates the state transition diagram in a receive mode.

The programmable features listed above allow for programming of header pattern parameters and for the specific details of the states of the state machine and the allowable transitions. FIG. 6 illustrates an example of this.

The serial receive interface function operation begins with the header buffer 103 comparing the incoming data 105 with one of the header patterns stored internally. When the header buffer 103 detects a match, it enables the next state control block 102 for a pre-programmed number of clock cycles. This pre-programmed number of clock cycles is equal to the number of clock cycles in the serial data frame. The state transition matrix including memory RAM 101 and next state control 102 simulates the state transitions of a state machine. Each address in the RAM 101 corresponds to a state. Transitions from state to state are given direction in the programming operation by storing in each RAM location the 'content' or state value of the next location (state) to which the machine will jump. This 'content' can be logically OR-ed with the data input and/or a control word provided by the central processing unit. This permits conditional branches and decision-making based on data input according to the requirements of a Mealy machine.

The state transition output table 104 constantly monitors the current and previous state of the state transition memory. The state transition output table is programmed with gets of current state and previous state addresses and the corresponding output data associated with each. When the state transition output table detects a transition from a programmed current state to a programmed next state, it will output the data at output 110 associated with the transition. Data Ready signals 108 and 109 provide control of the data flow to the serial-to-parallel converter block 107 and first-in-first-out buffer 100 respectively. The output data 110 data is in serial format. The first-in-first-out buffer 100 receives parallel data. Thus the data is converted to parallel form in block 107 and is then passed at the parallel data output 111 to the first-in-first-out buffer 100.

Transmit Operation

Figure 2:
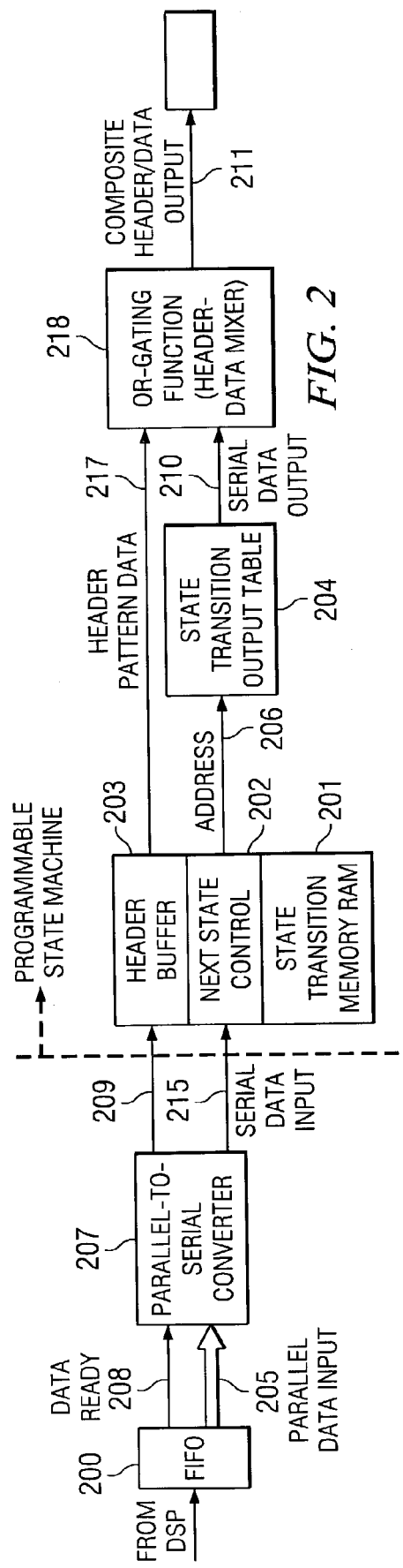
FIG. 2 illustrates the serial interface transmit block diagram.

These main components of the serial interface can be also configured for transmit operation as illustrated in FIG. 2. The main components are: (a) a header buffer 203, (b) the state transition matrix comprised of the state transition memory RAM 201 and the next state control block 202 and (c) state transition output table 204.

Figure 7:
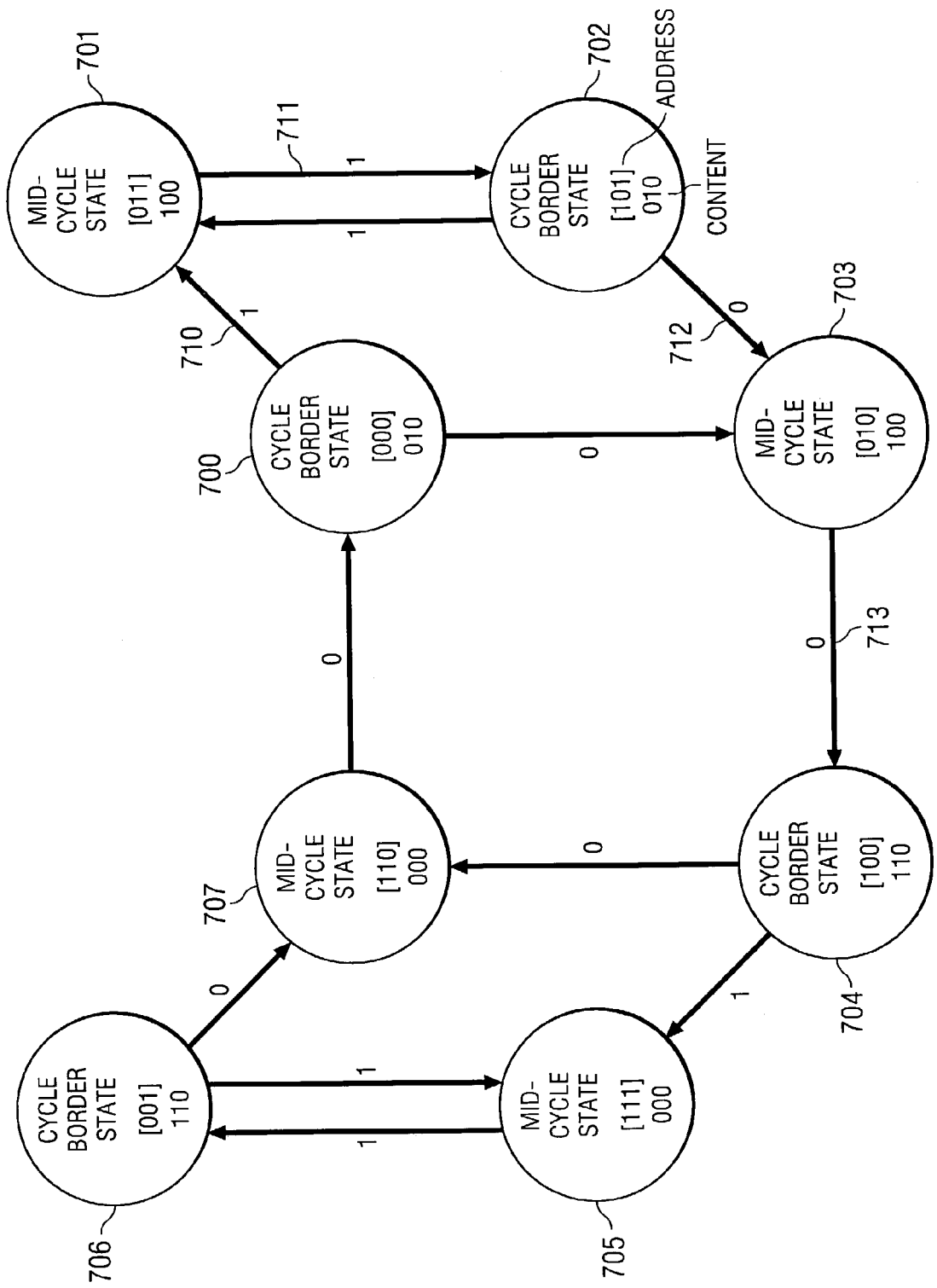
FIG. 7 illustrates the state transition diagram in a transmit mode.

Program features for transmit mode allow for programming of header pattern parameters and for the specific details of the states of the state machine and the allowable transitions. FIG. 7 illustrates an example of this.

The operation of the serial transmit interface function proceeds as follows. Parallel input data 205 is passed from the first-in-first-out buffer 200 to a parallel-to-serial converter block 207. When sufficient data to fill a serial frame is available, first-in-first-out buffer 200 issues a data ready signal 208 to the parallel-to-serial converter 207, which in turn with input 209 triggers the header buffer 203. The header buffer provides via path 217 the header pattern data stored internally. This header information is placed at the beginning of a frame to be transmitted.

When the header buffer 203 has completed its portion of the transmitting function, it enables the next state control block 202 for a pre-programmed number of clock cycles. This pre-programmed number of clock cycles is equal to the number of clock cycles in the serial frame.

The state transition matrix including memory RAM 201 and next state control 202 simulates the state transitions of a state machine. Each address in this RAM corresponds to a state. Transitions from state to state are accomplished by storing in each location the next location (state) to which the machine will next jump. The 'content' of each location can be logically OR-ed with the data input and/or a control word written by the central processing unit. This permits conditional branches and decision-making based on data input.

The state transition output table 204 monitors the current address and previous address of the state transition memory. The state transition output table 204 is Programmed with sets of current address and previous address and has an output data bit associated with each. When the state transition output table 204 detects a transition from a programmed 'current' address to a programmed 'next' address, it will output the data via line 210 associated with the transition. OR-gating function block 218 provides the means to combine the header data with the Information data to for a the composite data output 211. The composite data sequence always consists of the header pattern data followed by the serial information data.

Programming the Receive Interface Header Parameters

Figure 3:
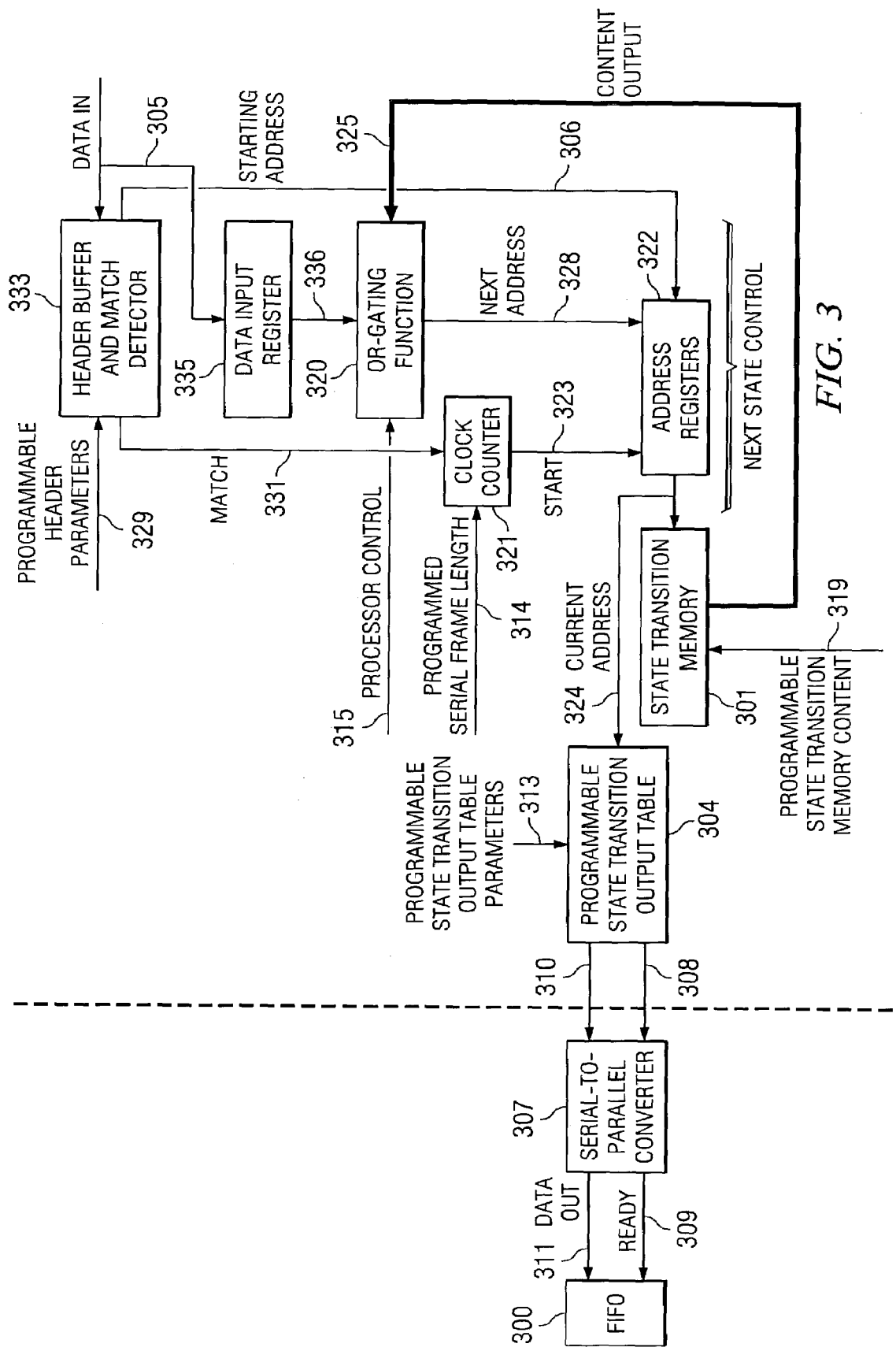
FIG. 3 illustrates the implementation details of the programmable state machine portion of the serial interface for receive mode.

FIG. 3 illustrates the implementation details of the programmable state machine portion of the serial interface for receive mode.

Program header parameter data enters the header buffer as input 329. Several header buffer registers are typically provided for storing of possible received headers. A conventional header word would consist of 16 bits including, for example, an 8-bit header pattern (bits 0–7), a 4-bit length code (bits 8–11) and a 4-bit jump address code (bits 12–15).

Serial Frame Length

Program serial frame length which is a known quantity to the programmer enters the clock counter 321 via path 314 and is stored in a register allowing initialization of the clock counter upon receipt of an active 'match' signal 331.

State Transition Memory

Program input 319 provides address and content information for the transition state diagram to be stored in the state transition memory. FIG. 6 illustrates further details of the transition state diagram.

State Transition Output Table

Program input 313 provides current address, next address and output bit table information for the state transition output table 304. Table 1 shows further details of the transition state transition output table for the receive mode.

Implementation Details of Receive Interface

Refer again to FIG. 3. The data to be received in coded form enters the receive interface at data input 305. This data enters the header buffer and match detector block 333 for detection of a match to one of several possible stored headers. Once a complete header is detected, the header buffer generates a corresponding output start address 306 and a match signal 331. This match signal 331 starts the clock counter 321 from a value equal to the programmed serial frame length. The clock counter 321 issues a start signal 323 to the address registers 322 to receive the start address 306. The clock counter 321 counts down to zero for a pre-programmed number of clock cycles. When it reaches this value, it will then set the address register 322 to an all-logical '1' condition to halt further transitions until another 'start' bit 323 from the clock counter becomes active.

With the clock counter 321 initialized to the length of the serial frame, the state machine will process the data and then stop until the next header is ready to be processed.

The state transition output table 304 is programmed with sets of current state and previous state addresses and the corresponding output data associated with each. When the state transition output table 304 detects a transition from a programmed current state to a programmed next state, it will output the corresponding data at output 310 associated with the transition. This data is in serial format. First-in-first-out buffer 300 receives parallel data. Thus the data in serial form is converted to parallel form in block 307 and is then passed to first-in-first-out buffer 300. Data Ready signals 308 and 309 provide control of the data flow to the serial-to-parallel converter block 307 and first-in-first-out buffer 300 respectively.

The heart of this system is the state transition memory 301. The 'content' output 325 of the state transition memory is OR-ed in block 320 with serial input data from a processor control word 31D and data input 336 from data input register 335. This fulfills the requirement of a Mealy state machine. The next address 328 is then passed to the address registers 322. The 'content' data fed back in path 325 is the 'content' information loaded into the state transition memory by programming.

FIG. 6 illustrates an example of a receiver decoding state machine. This example utilizes bi-phase coding which is described next in conjunction with FIG. 5.

Bi-Phase Coding

Figure 5:
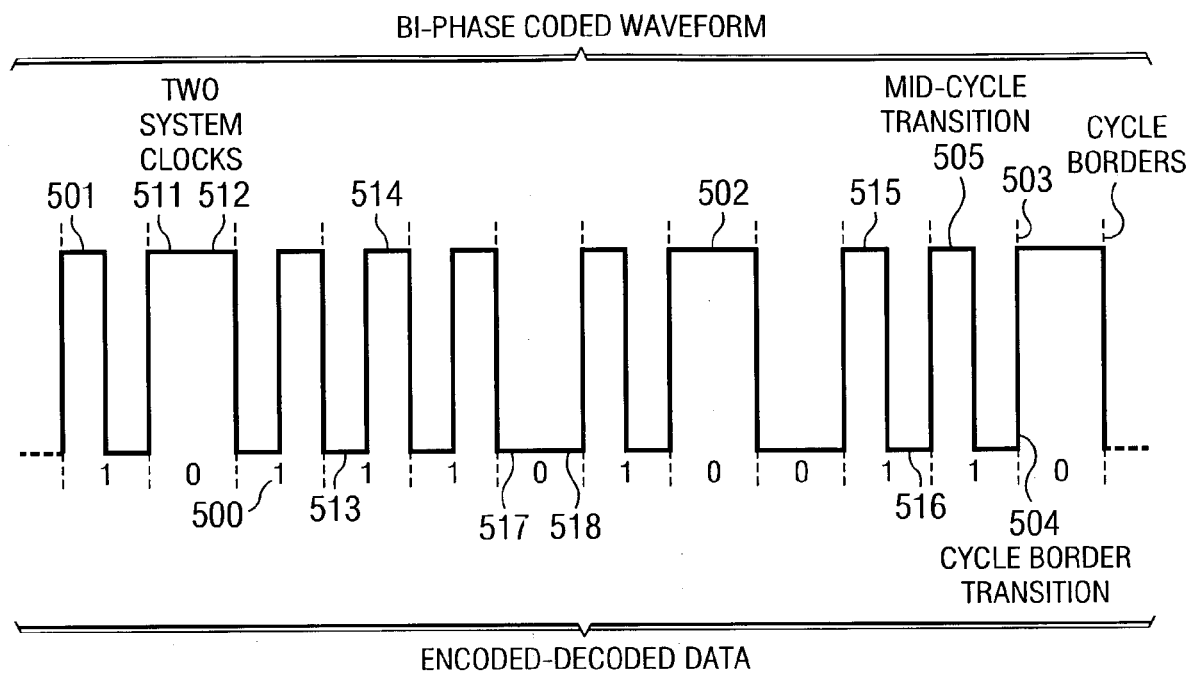
FIG. 5 illustrates bi-phase coding of a serial data bit stream.

In bi-phase coding a mid-cycle transition occurs for every logical '1' bit. No transition occurs for a logical '0'. As illustrated in FIG. 5, the bold state values of data 500 are to be encoded in or retrieved from the transmitted bit stream 502 with transitions such as 503, 505 occurring on each and every cycle border providing useful timing information for the decoding process. Thus data 500 has the form of the bits of a serial data stream to be encoded in or decoded from the received bi-phase coded waveform 502. In the bi-phase encoding scheme, an input of a '1' is coded as a transition either from 'low' to 'high' (illustrated by 513 and 514) or from 'high' to 'low' (illustrated by 515 and 516), this transition occurring during mid-cycle. An input of a '0' is coded by the absence of any transition during mid-cycle and is illustrated by 511 and 512 and 517 and 518. Note two clocks fall within each cycle border as denoted by 501. The transmitted waveform is stable and undergoes no transitions near the mid-point of each system clock, these times being illustrated by 511 through 518. The transmitted waveform undergoes transitions at cycle borders illustrated by 504 and at mid-cycle as illustrated by 505.

Receive Interface Example

FIG. 6 illustrates a possible implementation of a receive interface state machine. Assume that the task is to build a state machine to decode bi-phase coding as in serial/parallel data interface. In bi-phase decoding any mid-cycle transition is decoded as a '1'. The absence of a transition during mid-cycle is decoded as a '0'.

In transitions from state 600 to state 601 to state 602, includes no edge but instead a steady '1' state denoted by 611 followed by 612 in the incoming data. This received data is decoded as '0'. This sequence of states is represented by the first row of Table 1.

In transitions from state 602 to state 603 and back to state 602, a positive edge is detected in incoming data because it changes from a '0' to a '1' as denoted by 613 followed by 614 and data received is decoded as '1'. This sequence of states is represented by the sixth row of Table 1.

Each state is accompanied by a data input '1' or '0' directing the transition to the next state. The receive state sequence entries in Table 1 track the eight possible transitions in a data input cycle. All transitions start and terminate in either State Addresses '000' or '001' labeled 'cycle border states'.

TABLE 1

| Border → Mid-Cycle → Border | Input Data | Output Data | Decoded Data |
| --- | --- | --- | --- |
| 600 → 601 → 602 | 1 → 1 | 0 | 0 |
| 000 → 011 → 001 | | | |
| 600 → 603 → 602 | 0 → 1 | 1 | 1 |
| 000 → 010 → 001 | | | |
| 600 → 603 → 600 | 0 → 0 | 0 | 0 |
| 000 → 010 → 000 | | | |
| 600 → 601 → 600 | 1 → 0 | 1 | 1 |
| 000 → 011 → 000 | | | |
| 602 → 601 → 600 | 1 → 0 | 1 | 1 |
| 001 → 011 → 000 | | | |
| 602 → 603 → 602 | 0 → 1 | 1 | 1 |
| 001 → 010 → 001 | | | |
| 602 → 601 → 602 | 1 → 1 | 0 | 0 |
| 001 → 011 → 001 | | | |
| 602 → 603 → 600 | 1 → 1 | 0 | 0 |
| 001 → 010 → 000 | | | |

Programming the Transmit Interface

Header Parameters

Figure 4:
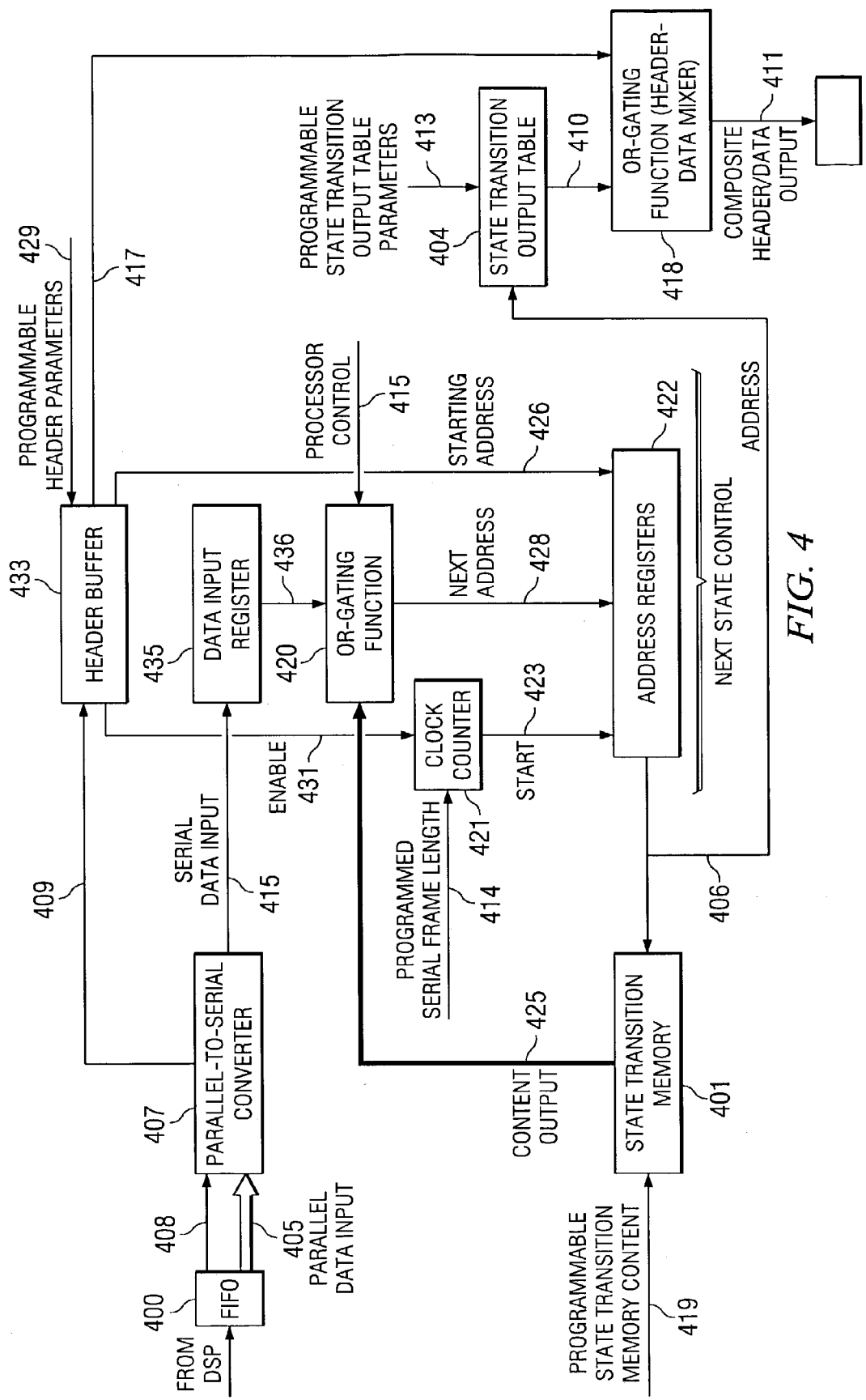
FIG. 4 illustrates the implementation details of the programmable state machine portion of the serial interface for transmit mode.

FIG. 4 illustrates implementation details of the programmable state machine portion of the serial interface for transmit mode.

Program header parameter data enters the header buffer at input 429. Several header buffers are typically provided for storing of possible headers. A conventional header word would consist of 16 bits including, for example, an 8-bit header pattern (bits 0–7), a 4-bit length code (bits 8–11) and a 4bit jump address code (bits 12–15). These header words are output at the beginning of a frame of transmitted data.

Serial Frame Length

Program serial frame length enters the clock counter 421 via path 414 and is stored in a register allowing initialization of the clock counter upon receipt of an active 'enable' signal 431.

State Transition Memory

Program input 419 provides address and content information for the transition state diagram to be stored in the state transition memory. FIG. 7 illustrates further details of the transition state diagram for a transmit example.

State Transition Output Table

Program input 413 provides current address, next address and output bit table information for the state transition output table 404. Table 2 shows further details of the transition state transition output table.

Implementation Details of Transmit Interface

Refer again to FIG. 4. The operation of the serial transmit interface function proceeds as follows. The data to be transmitted in coded form enters the transmit interface at parallel data input 405. When sufficient data to fill a serial frame is available, the first-in-first-out buffer 400 issues a data ready signal 408 to the parallel-to-serial converter 407, which in turn with input 409 triggers the header buffer 433. The header is transmitted via path 417 to be combined with output data in the OR-gating function block 418 to form the composite header/data output 411.

Once a complete header has been output, the header buffer generates a corresponding output start address 426 and an enable signal 431. This enable signal 431 starts the clock counter 421 from a value equal to the programmed serial frame length. The clock counter 421 issues a start signal 423 to the address registers 422 to receive the start address 426. The clock counter 421 counts down to zero for a pre-programmed number of clock cycles. When it reaches this value, it will then set the address register 422 to an all-logical '1' condition to halt further transitions until another 'start' bit 423 from the clock counter becomes active.

With the clock counter 421 initialized to the length of the serial frame, the state machine will process the data and then stop until the next header is ready to be processed.

The heart of this system is the state transition memory 401. The 'content' output 425 of the state transition memory is OR-ed in block 420 with serial input data from a processor control word 415 and data input 436 from data input register 435. The next address 428 is then passed to the address registers 422. The 'content' data fed back in path 425 is the 'content' information loaded into the state transition memory by programming.

The state transition output table 404 monitors the current and previous state addresses 406 of the state transition memory. The state transition output table is programmed with sets of current state and previous state addresses and the corresponding output data associated with each. When the state transition output table detects a transition from a programmed current state to a programmed next state, it will output the data at output 410 associated with the transition. FIG. 7 illustrates an example of a transmit encoding state machine. This example utilizes bi-phase coding illustrated in FIG. 5.

Transmit Interface Example

Assume the task is to build a state machine to encode bi-phase coding as in serial/parallel data interface. In this scheme, a data input '1' results in the output toggling (from '0' to '1' or from '1' to '0') and an input of '0' results in no toggling (a '11' output, or a '00' output).

Refer to FIG. 7. Note that each cycle border state is accompanied by two successive data inputs of '1' or '0' directing the transition to the succeeding states. One example is the inputs 710 and 711 that are successive '1' inputs. A second example is the inputs 712 and 713 that are successive '0' inputs. The transmit state sequence entries in Table 2 track the eight possible transitions in a data input cycle. In the transmit case all full cycles from a border state through a mid-cycle state and then to another border state start and terminate on one of the four possible border states '000', '101', '100', or '001'.

TABLE 2

| Border → Mid-Cycle → Border | Input Data | Output Data | Decoded Data |
|---|---|---|---|
| 700 → 701 → 702<br>000 → 011 → 001 | 1 → 1 | 1 → 0 | 1 |
| 700 → 704 → 704<br>000 → 010 → 100 | 0 → 0 | 1 → 1 | 0 |
| 702 → 701 → 702<br>101 → 011 → 101 | 1 → 1 | 1 → 0 | 1 |
| 702 → 704 → 704<br>101 → 010 → 100 | 0 → 0 | 1 → 1 | 0 |
| 704 → 705 → 706<br>100 → 111 → 001 | 1 → 1 | 0 → 1 | 1 |
| 704 → 707 → 700<br>100 → 110 → 000 | 0 → 0 | 0 → 0 | 0 |
| 706 → 707 → 700<br>001 → 110 → 000 | 0 → 0 | 0 → 0 | 0 |
| 706 → 705 → 706<br>001 → 111 → 001 | 1 → 1 | 0 → 1 | 1 |

What is claimed is:

1. A programmable Mealy state machine comprising:
a header pattern buffer receiving input header parameter information and generating a starting address corresponding to data input and a match signal when a data input matches a header pattern stored therein;
a programmable state transition memory having stored states at locations corresponding to said starting addresses, a next state derived from said stored state at said location corresponding to said starting address;
a next state control circuit connected to said header pattern buffer and controlling said programmable state transition memory for a predetermined plural number of cycles; and
an output device generating an output upon receipt of a next state from said programmable state transition memory.

2. The programmable Mealy state machine of claim 1 wherein:
said header pattern buffer includes plural transition output table registers, each transition output table register including a predetermined number of header pattern bits and a predetermined number of jump address bits, each transition output table register outputting said jump address bits if a received input matches said header pattern bits.

3. The programmable Mealy state machine of claim 1 further comprising:
a next state control receiving an input header pattern buffer output and a current state from said programmable state transition memory and generating a next address for said programmable state transition memory.

4. The programmable Mealy state machine of claim 1 wherein:
said output device includes a state transition output table, wherein said state transition output table
receives said output of said programmable state transition memory,
detects current and prior output of said programmable state transition memory, and
generates an output corresponding to next output of said programmable state transition memory.

5. The programmable Mealy state machine of claim 1 wherein:
said header pattern buffer receives said input header parameter input in serial form from a parallel to serial converter receiving a parallel data input and outputting said input header pattern information in serial form.

6. The programmable Mealy state machine of claim 1 wherein:
said programmable state transition memory supplied serial output data to an output serial to parallel converter which receives said serial output data and outputs data in parallel.

7. A programmable Mealy state machine comprising:
a header pattern buffer receiving input header parameter information and generating a starting address corresponding to data input and a match signal when a data input matches a header pattern stored therein;
a programmable state transition memory having stored states at locations corresponding to said starting addresses, a next state derived from said stored state at said location corresponding to said starting address;
a next state control circuit connected to said header pattern buffer and controlling said programmable state transition memory for a predetermined number of cycles, said next state control circuit including a programmable counter loaded with said predetermined number, said programmable counter started upon receipt of said match signal and halting further transitions of said programmable state transition memory upon expiration of said predetermined number of cycles; and
an output device generating an output upon receipt of a next state from said programmable state transition memory.

8. The programmable Mealy state machine of claim 7 wherein:
said header pattern buffer includes plural transition output table registers, each transition output table register including a predetermined number of header pattern bits and a predetermined number of jump address bits, each transition output table register outputting said jump address bits if a received input matches said header pattern bits.

9. The programmable Mealy state machine of claim 7 further comprising:
a next state control receiving an input header pattern buffer output and a current state from said programmable state transition memory and generating a next address for said programmable state transition memory.

10. The programmable Mealy state machine of claim 7 wherein:
said output device includes a state transition output table, wherein said state transition output table
receives said output of said programmable state transition memory,
detects current and prior output of said programmable state transition memory, and generates an output corresponding to next output of said programmable state transition memory.

11. The programmable Mealy state machine of claim 7 wherein:

said header pattern buffer receives said input header parameter input in serial form from a parallel to serial converter receiving a parallel data input and outputting said input header pattern information in serial form.

12. The programmable Mealy state machine of claim 7 wherein:

said programmable state transition memory supplied serial output data to an output serial to parallel converter which receives said serial output data and outputs data in parallel.

* * * * *